(12) United States Patent
Wojciechowski et al.

(10) Patent No.: US 11,022,147 B2
(45) Date of Patent: Jun. 1, 2021

(54) INLET GUIDE VANE REMOVAL TOOLS AND METHODS

(71) Applicant: General Electric Company, Schenectady, NY (US)

(72) Inventors: Piotr Hubert Wojciechowski, Warsaw (PL); John William Herbold, Fountain Inn, SC (US); Szymon Perkowski, Warsaw (PL)

(73) Assignee: Haier US Appliance Solutions, Inc., Wilmington, DE (US)

( * ) Notice: Subject to any disclaimer, the term of this patent is extended or adjusted under 35 U.S.C. 154(b) by 44 days.

(21) Appl. No.: 16/349,104

(22) PCT Filed: Nov. 15, 2016

(86) PCT No.: PCT/PL2016/000126
§ 371 (c)(1),
(2) Date: May 10, 2019

(87) PCT Pub. No.: WO2018/093277
PCT Pub. Date: May 24, 2018

(65) Prior Publication Data
US 2019/0271330 A1    Sep. 5, 2019

(51) Int. Cl.
*B25B 27/00* (2006.01)
*F04D 29/64* (2006.01)
*B25B 27/02* (2006.01)
*F01D 17/16* (2006.01)
*F04D 29/56* (2006.01)
(Continued)

(52) U.S. Cl.
CPC ............ *F04D 29/644* (2013.01); *B23P 19/04* (2013.01); *B25B 27/023* (2013.01); *B25B 27/026* (2013.01); *F01D 17/162* (2013.01); *F04D 29/563* (2013.01); *F01D 25/285* (2013.01);
(Continued)

(58) Field of Classification Search
CPC .......... B23P 19/00; B23P 19/04; B23P 19/10; B23P 23/00; B25B 27/03; B25B 31/00; F04D 29/644
See application file for complete search history.

(56) References Cited

U.S. PATENT DOCUMENTS 4,096,614 A    6/1978  Brungard et al.
5,098,066 A *  3/1992  Willcox, III ............... B66F 3/36
                                                    254/134
(Continued)

FOREIGN PATENT DOCUMENTS

EP    1207272 A2    5/2002

OTHER PUBLICATIONS

General Electric Company; International Patent Application No. PCT/PL2016/000126; International Search Repot; dated Jul. 12, 2017; (2 pages).

*Primary Examiner* — Lee D Wilson
(74) *Attorney, Agent, or Firm* — Dority & Manning, P.A.

(57) ABSTRACT

An inlet guide vane removal assembly includes a support frame with a support plate. At least one force device is coupled to the support plate. A puller bracket is attached to the at least one force device. The puller bracket has an open-ended slot defined therethrough, and a plurality of flanges positioned to engage an installed inlet guide vane. When the force device is actuated, the puller bracket is displaced relative to the support frame to facilitate removing the inlet guide vane.

18 Claims, 9 Drawing Sheets

(51) Int. Cl.
*B23P 19/04* (2006.01)
*F01D 25/28* (2006.01)

(52) U.S. Cl.
CPC ...... *F05D 2230/68* (2013.01); *F05D 2230/70* (2013.01); *F05D 2260/4031* (2013.01)

(56) References Cited

U.S. PATENT DOCUMENTS

| | | | |
|---|---|---|---|
| 5,181,693 A * | 1/1993 | Lorenz | B66F 3/24 |
| | | | 254/2 R |
| 5,560,841 A | 10/1996 | Demichael | |
| 6,398,188 B1 * | 6/2002 | Salman | E02D 13/02 |
| | | | 254/30 |
| 6,450,763 B1 | 9/2002 | Crum et al. | |
| 6,976,670 B1 | 12/2005 | Woolley et al. | |
| 2010/0263183 A1 | 10/2010 | Holmes et al. | |
| 2019/0271330 A1 * | 9/2019 | Wojciechowski | F04D 29/644 |

* cited by examiner

INLET GUIDE VANE REMOVAL TOOLS AND METHODS

This application is a National Stage Patent Application of PCT/PL2016/000126, filed on Nov. 15, 2016, the disclosure of which is incorporated by reference herein in its entirety.

BACKGROUND

The field of this disclosure relates generally to turbine assemblies and, more particularly, to tools and methods for use in removing inlet guide vanes from the turbine assemblies.

At least some known turbine assemblies include axial compressors having an inlet guide vane assembly at the compressor inlet. The inlet guide vane assembly includes a circumferential array of variable pitch inlet guide vanes. The inlet guide vane assembly controls the airflow channeled to the compressor inlet. In addition, the inlet guide vane assembly may be adjusted during operation to facilitate a higher firing temperature at reduced loads for regenerative-cycle and combined-cycle applications. At least some known inlet guide vanes are gear actuated from external to the inlet casing, using an annular drive ring, a geared rack, and a drive gear such that the vanes are turned in unison during operation.

Known inlet guide vanes are supported in two semi-annular halves of the turbine assembly, such as within an upper and lower inlet casing. Removal and replacement of the inlet guide vanes in the upper inlet casing is accomplished relatively easily using known tools, such as a gear puller, to remove the drive gear from a respective inlet guide vane while the upper inlet casing is removed. However, removal and replacement of the inlet guide vanes in the lower inlet casing may be difficult, as access is limited due to space limitations because the inlet guide vane adjustment drive is located external to the lower inlet casing. Use of the gear puller is difficult on the bottom half and near the horizontal joint, where scaffolding is installed during inspection and maintenance. Thus, using known tools and methods, it may be challenging, time consuming, laborious, and expensive to manually remove the drive gear coupled to the lower half inlet guide vanes of a turbine assembly.

BRIEF DESCRIPTION

In one aspect, an inlet guide vane removal assembly is provided. The inlet guide vane removal assembly includes a support frame including a support plate, at least one force device coupled to the support plate, and a puller bracket coupled to the at least one force device. The puller bracket includes an open-ended slot defined therethrough, and a plurality of flanges positioned to engage an installed inlet guide vane. When the force device is actuated, the puller bracket is displaced relative to the support frame to facilitate removal of the inlet guide vane.

In another aspect, a method for removing an inlet guide vane from a turbine assembly is provided. The method includes at least partially disassembling a casing of the turbine assembly to provide access to the inlet guide vane. The method also includes engaging the inlet guide vane using an inlet guide vane removal assembly. Moreover, the method includes applying a force to a puller bracket of the inlet guide vane removal assembly, such that the inlet guide vane is displaced within the turbine assembly, to facilitate removing a drive gear from the inlet guide vane. Moreover, the method includes removing the inlet guide vane from the turbine assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
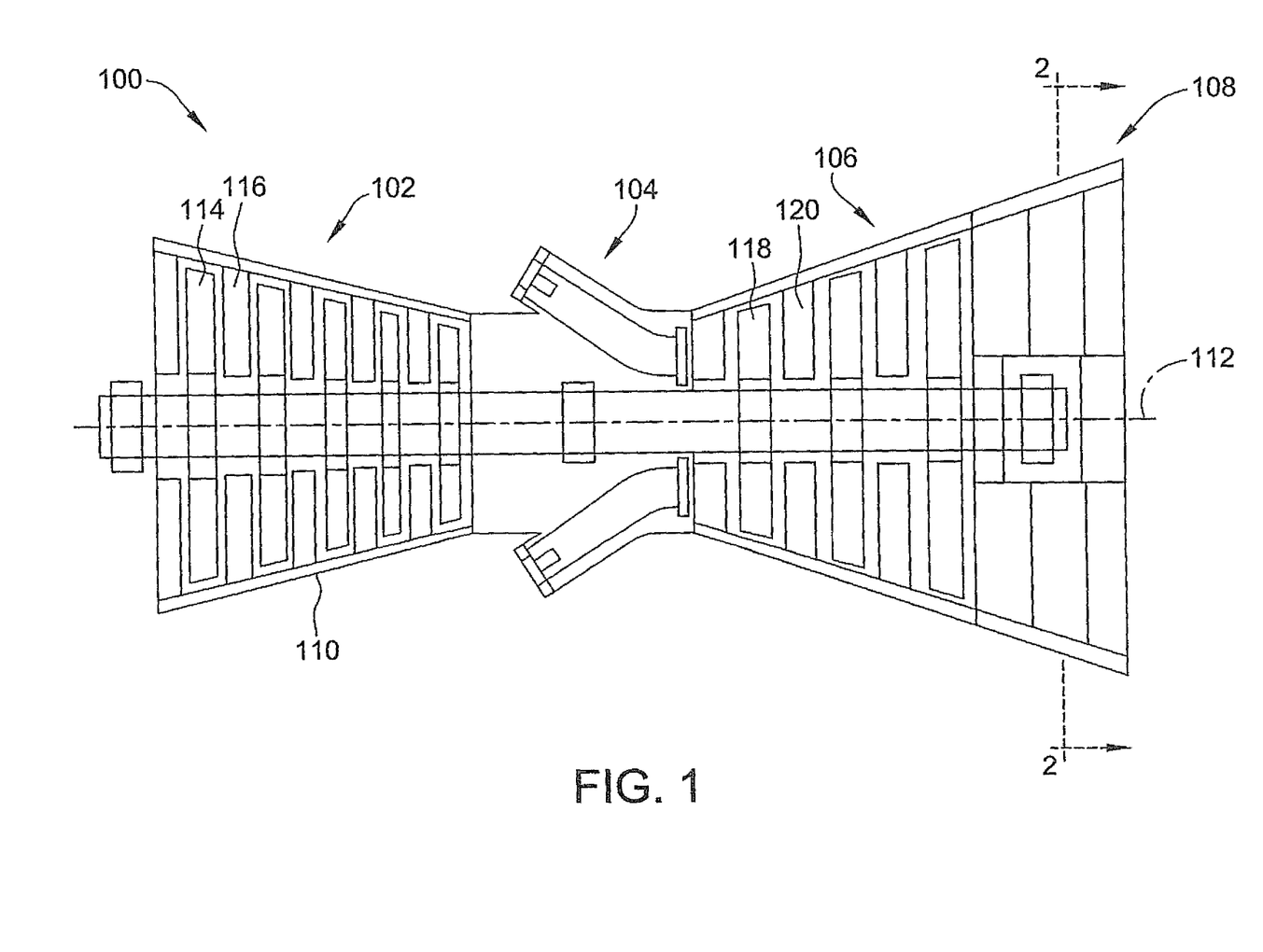
FIG. 1 is a schematic view of an exemplary turbine assembly.

FIG. 1 is a schematic plan view of an exemplary turbine assembly 100. In the exemplary embodiment, turbine assembly 100 is a gas turbine assembly that includes a compressor 102, a plurality of combustors 104, and a turbine 106 coupled to each other in serial flow communication about a rotor 108. A casing 110 supports and encloses compressor 102, combustor 104, and turbine 106, which are spaced along a centerline axis 112. In the exemplary embodiment, casing 110 is split into an upper casing (not shown) and a lower casing 124, each extending substantially 180° and enclosing half of compressor 102, combustor 104, and turbine 106. Lower casing 124 and the upper casing are coupled together at a horizontal joint (not shown). The views shown in all of the figures are understood to be taken through lower casing 124, adjacent the horizontal joint.

In the exemplary embodiment, turbine assembly 100 also includes a plurality of inlet guide vanes 122 that are circumferentially-spaced about centerline axis 112, forming an annular array. The annular array of inlet guide vanes 122 is located forward of a first compressor stage 130 of compressor 102, surrounding rotor 108. Inlet guide vanes 122 channel working fluid 114 into compressor 102. Each inlet guide vane 122 is rotatable to facilitate varying an amount and a direction of working fluid 114 entering compressor 102. In the exemplary embodiment, turbine assembly 100 includes any suitable quantity of inlet guide vanes 122 spaced in any suitable manner about centerline axis 112.

In operation, a flow of working fluid 114 (e.g., ambient air) enters compressor 102 through inlet guide vanes 122 and is compressed. A flow of compressed fluid 116 is channeled from compressor 102 to the plurality of combustors 104. Compressed fluid 116 is mixed with fuel and ignited to generate a flow of combustion gases 118. Combustion gases 118 are channeled through turbine 106 and discharged from turbine assembly 100 as exhaust gases 120.

Figure 2:
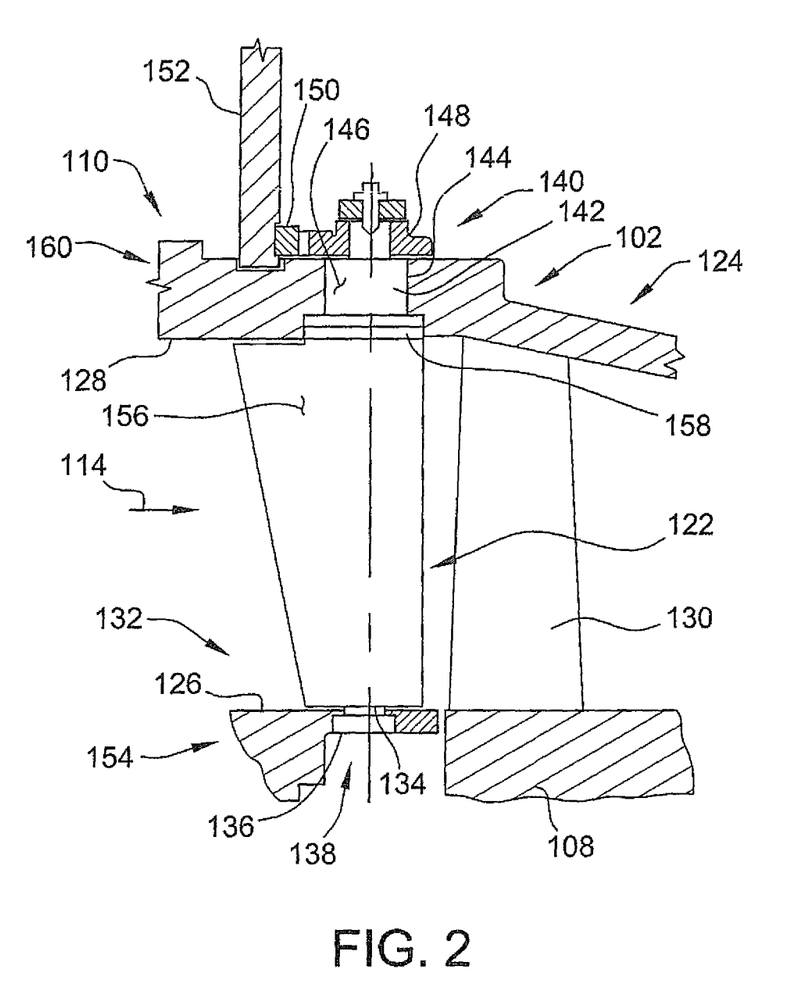
FIG. 2 is an enlarged portion of the turbine assembly shown in FIG. 1 and taken within area 2.

FIG. 2 is an enlarged detail view of turbine assembly 100, taken within area 2 (shown in FIG. 1) and illustrating a respective inlet guide vane 122. In the exemplary embodiment, inlet guide vane 122 is coupled in lower casing 124 between a radially inner wall 126 and an outer wall 128. Radially inner wall 126 is defined, in part, by one or more inner ring halves 154. As shown in FIG. 2, inner ring half 154 is radially inward from outer wall 128 of lower casing 124. A radially inner end 132 of each inlet guide vane 122 includes a radially-extending, cylindrical shaft 134 that is supported in a bushing 136 seated within a hole 138 formed in a portion of inner ring half 154. Thus, inlet guide vane 122 is adjustably rotatable about shaft 134. Inlet guide vane 122 includes an airfoil portion 156 that extends between lower casing 124 and inner ring half 154.

A radially outer end 140 of each inlet guide vane 122 is formed with an integral, radially-extending, extension shaft 142 that extends through a bore 144 in outer wall 128. Outer wall 128 is defined, in part, by one or more outer ring halves 160 of lower casing 124. Extension shaft 142 of inlet guide vane 122 includes a bearing head portion 158 positioned in bore 144, and a reduced diameter portion 146, wherein a drive gear 148 is coupled opposite bearing head portion 158. Drive gear 148 meshes with an annular gear rack 150 secured to a drive ring 152. Drive gear 148 is secured to reduced diameter portion 146 using a conventional anti-rotation member, for example, and without limitation, a key, a shear pin, a set screw, or any other suitable component that enables inlet guide vanes 122 to function as described herein. In addition, drive gear 148 is sized to couple to reduced diameter portion 146 via a friction fit. As used herein, the phrase "friction fit" means a value of tightness between reduced diameter portion 146 and drive gear 148, i.e., an amount of clearance between the components. A negative amount of clearance is commonly referred to as a press fit, where the magnitude of interference determines whether the fit is a light friction fit or a friction fit. A small amount of positive clearance is referred to as a loose or sliding fit. A gear puller (not shown) may be used to remove drive gear 148 from reduced diameter portion 146 of inlet guide vane 122. As is described herein, however, use of the gear puller is difficult on lower casing 124 of turbine assembly 100.

Figure 3:
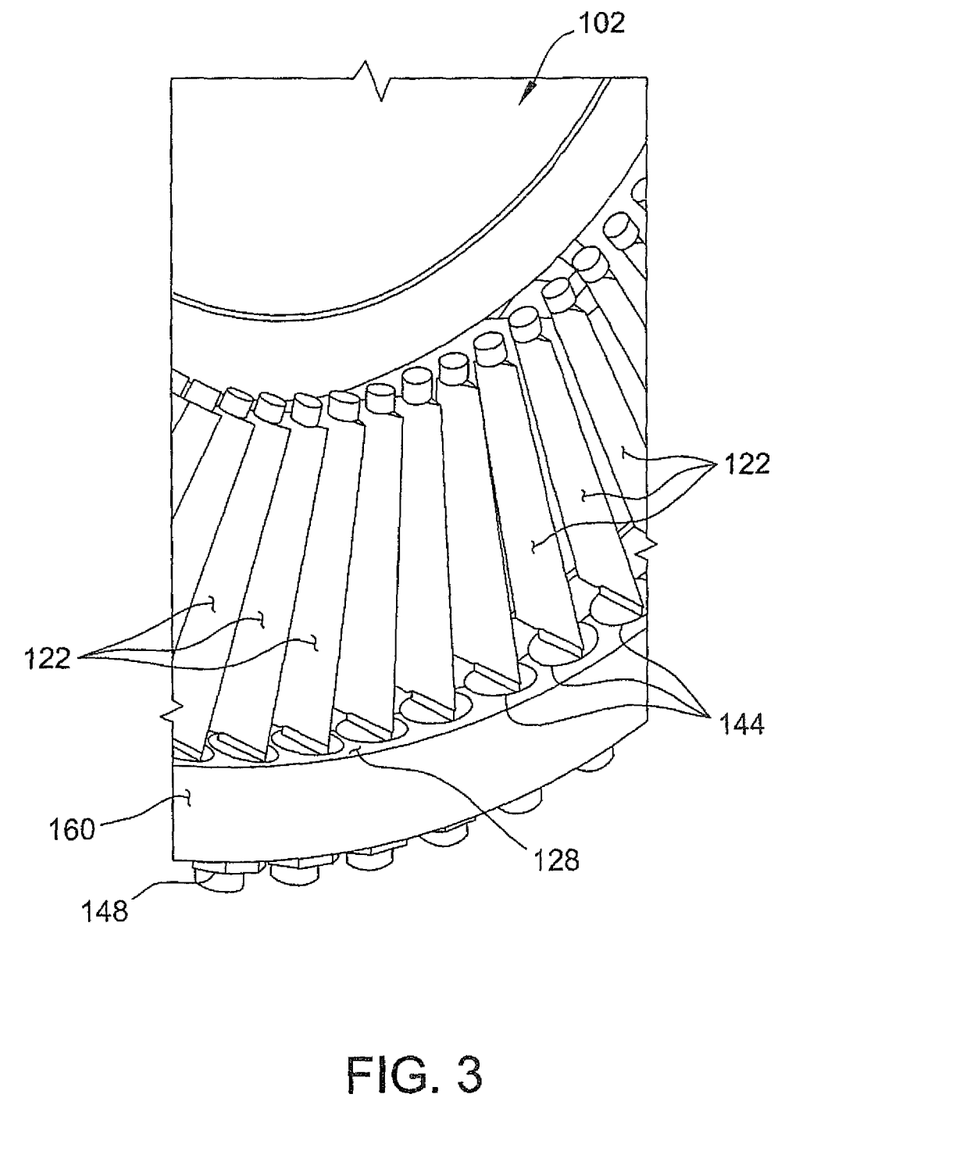
FIG. 3 is a partial perspective view of an outer ring half of the turbine assembly shown in FIG. 1.

FIG. 3 is a partial perspective view of outer ring half 160. In the exemplary embodiment, outer ring half 160 includes a plurality of bores 144 that are each defined in outer wall 128 of outer ring half 160. Moreover, each bore 144 is sized and shaped to receive an inlet guide vane 122 therein. In particular, each bore 144 receives extension shaft 142 of inlet guide vane 122 therein. In the exemplary embodiment, each outer ring half 160 is coupled to casing 110 (shown in FIG. 1) via coupling methods that include, but are not limited to, the use of retention hardware (not shown), a welding process, and/or any other mechanical coupling means that enables coupling outer ring half 160 to casing 110. Inlet guide vanes 122 are rotatably coupled to outer ring half 160, in part, via drive gear 148, which is coupled to extension shaft 142 extending through bore 144. As shown in FIG. 3, in preparing to remove inlet guide vanes 122, inner ring half 154 is removed from turbine assembly 100, and more particularly, from compressor 102, thereby exposing radially inner end 132 of each inlet guide vane 122. Inlet guide vanes 122 are rotated to their open position, such that they are positioned substantially perpendicular to the inlet of compressor 102.

Figure 4:
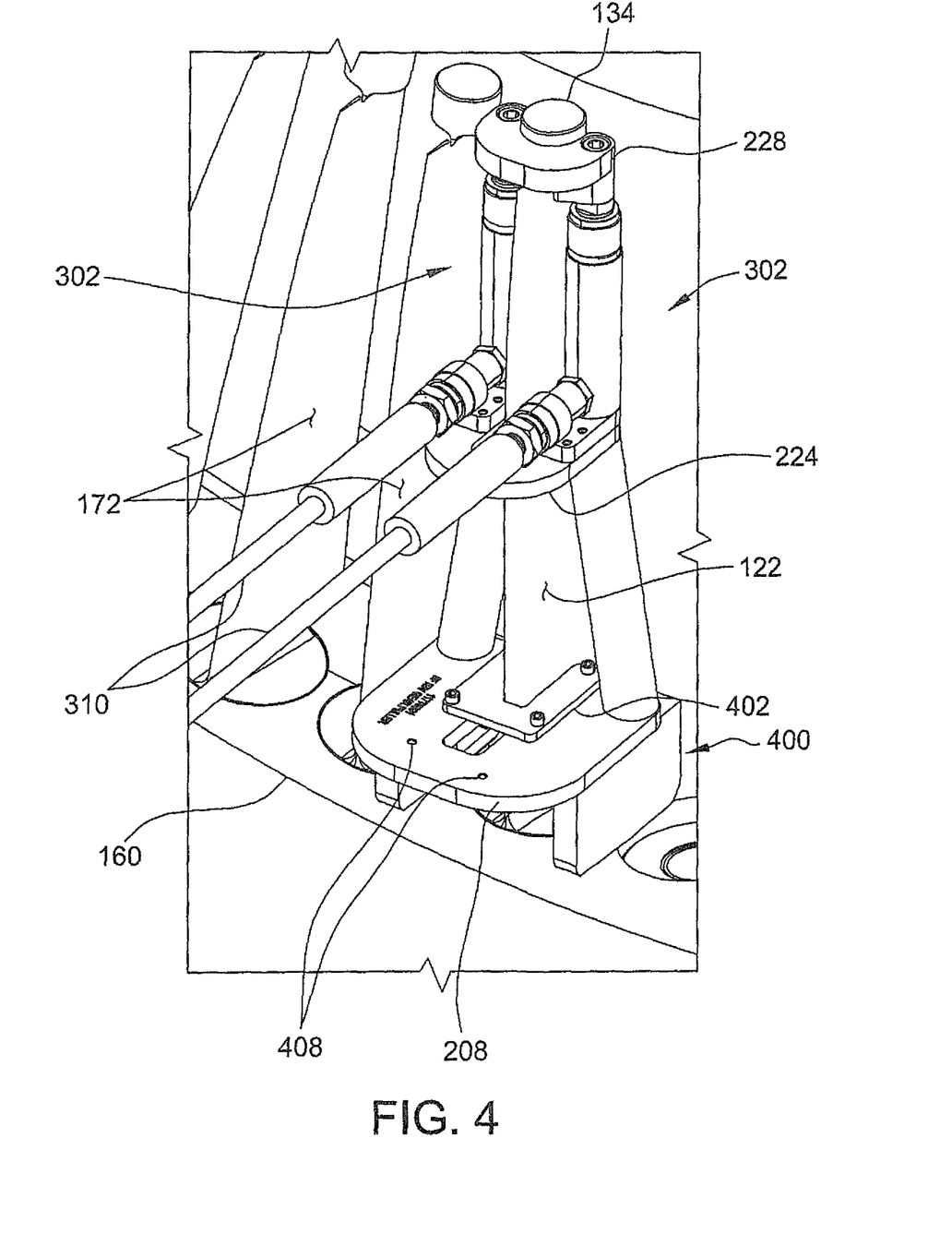
FIG. 4 is a partial perspective view of the outer ring half of FIG. 3 with an exemplary inlet guide vane removal assembly installed.
Figure 5:
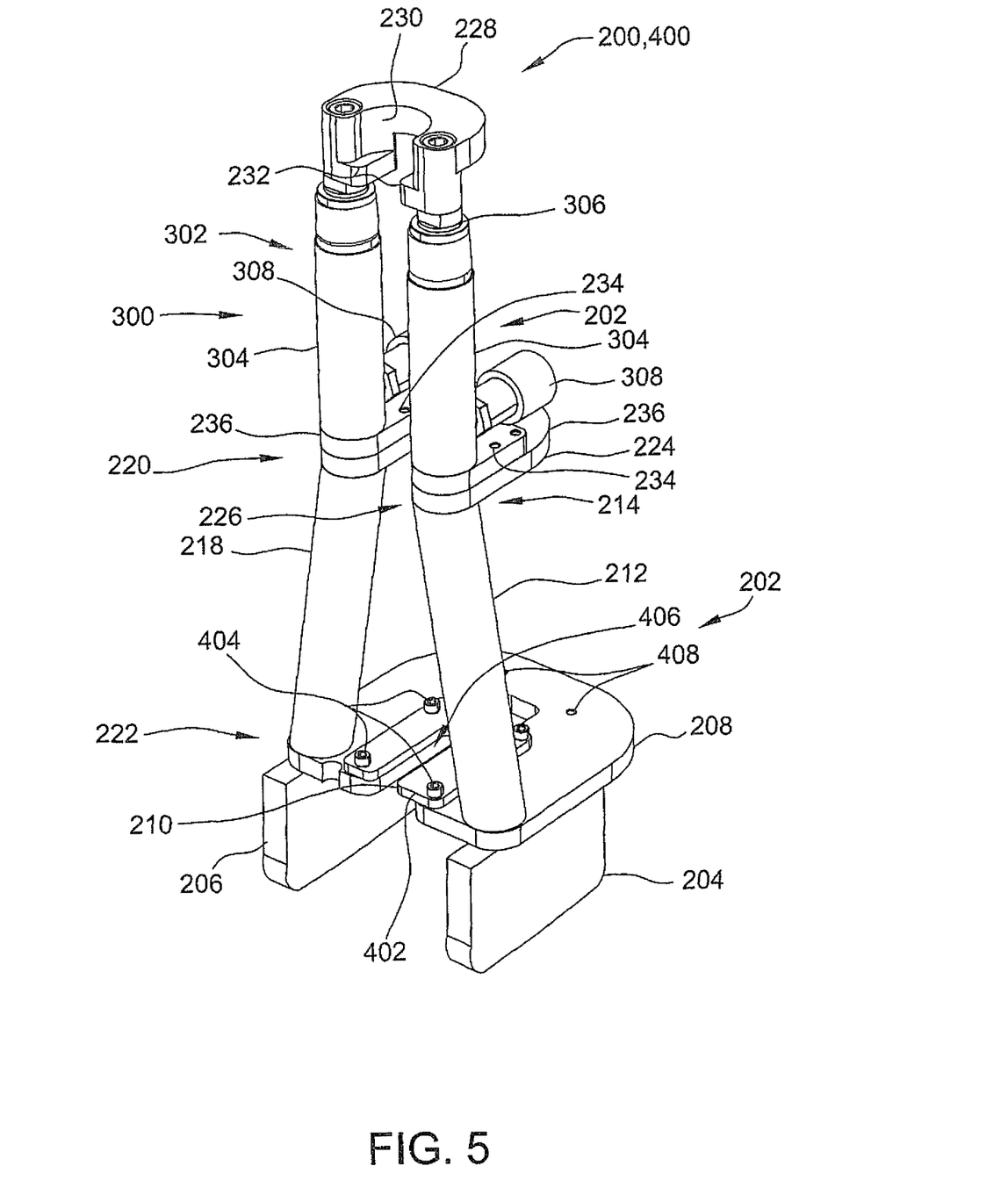
FIG. 5 is a perspective view of inlet guide vane removal assembly of FIG. 4.

FIG. 4 is a partial perspective view of outer ring half 160 with an exemplary inlet guide vane removal assembly 200 installed, and FIG. 5 is a perspective view of inlet guide vane removal assembly 200. As described herein, turbine assembly 100 includes outer ring half 160 with a plurality of inlet guide vanes 122 coupled thereto. Each inlet guide vane 122 includes a drive gear 148 (shown in FIG. 2) coupled thereto, facilitating securing inlet guide vane 122 to outer ring half 160. To remove a respective inlet guide vane 122 from outer ring half 160, drive gear 148 is pulled from extension shaft 142 (shown in FIG. 2) of inlet guide vane 122 using inlet guide vane removal assembly 200.

In the exemplary embodiment, inlet guide vane removal assembly 200 includes a support frame 202 that includes a first support leg 204 and a second support leg 206 that are substantially parallel to each other. Moreover, each support leg 204 and 206 is coupled to a guide plate 208 via coupling methods that include, but are not limited to, the use of retention hardware (not shown), a welding process, and/or any other mechanical coupling means for coupling support legs 204 and 206 to guide plate 208. Guide plate 208 includes an open-ended slot 210 sized to receive inlet guide vane 122, and more particularly, airfoil portion 156 (shown in FIG. 2), during use of inlet guide vane removal assembly 200. In the exemplary embodiment, support leg 204 and 206 and guide plate 208 are fabricated from steel. Alternatively, support leg 204 and 206, and/or guide plate 208 may be fabricated from any other material that enables support frame 202 to function as described herein.

In the exemplary embodiment, support frame 202 also includes a first support arm 212 including an upper end 214 and a lower end 216, a second support arm 218 including an upper end 220 and a lower end 222, and a support plate 224 that, in the exemplary embodiment, extends between upper ends 214 and 220. Support plate 224 includes an open-ended slot 226 sized to receive inlet guide vane 122, and more particularly airfoil portion 156 (shown in FIG. 2), during use of inlet guide vane removal assembly 200. In the exemplary embodiment, each support arm 212 and 218 is coupled to and forms a portion of support frame 202. More specifically, and in the exemplary embodiment, lower end 216 is coupled to first support leg 204 via guide plate 208, and lower end 222 is coupled to second support leg 206 via guide plate 208, such that support frame 202 extends about either side of inlet guide vane 122 during use of inlet guide vane removal assembly 200. Each support arm 212 and 218 is coupled to guide plate 208 and support plate 224 via coupling methods that include, but are not limited to, the use of retention hardware (not shown), a welding process, and/or any other mechanical coupling means for coupling support arms 212 and 218 to guide plate 208 and support plate 224. In the exemplary embodiment, support arms 212 and 218 and support plate 224 are fabricated from steel. Alternatively, support arms 212 and 218, and/or support plate 224 may be fabricated from any other material that enables support frame 202 to function as described herein. In alternative embodiments, support frame 202 is free of support arms 212 and 218 and support plate 224.

In the exemplary embodiment, inlet guide vane removal assembly 200 includes a pair of force devices 300 coupled to support plate 224 opposite support arms 212 and 218. Alternatively, in those embodiments free of support arms 212 and 218 and support plate 224, force devices 300 are coupled to guide plate 208 opposite support legs 204 and 206. In the exemplary embodiment, each force device 300 includes an actuator 302 and an engaging rod 306 that extends therefrom. Engaging rod 306 has a predefined stoke length that is sufficient to remove inlet guide vane 122 from drive gear 148. In the exemplary embodiment, actuator 302 is a hydraulic ram that includes a hydraulic cylinder 304 and a hydraulic piston (not shown) slidably engaged with hydraulic cylinder 304. The hydraulic piston includes engaging rod 306 that extends away from hydraulic cylinder 304 and couples to a puller bracket 228. As such, when actuator 302 is operated, engaging rod 306 extends from and retracts into hydraulic cylinder 304 to impart a motive force to inlet guide vane 122 through puller bracket 228. In addition, hydraulic cylinder 304 includes a hydraulic hose connection 308 sized to receive a hose (not shown) coupled to a pump (not shown). In an alternative embodiment, force device 300 is any device that enables inlet guide vane removal assembly 200 to function as described herein, for example, and without limitation, a lead screw and drive assembly or an air cylinder. In the exemplary embodiment, force devices 300 are coupled to support plate 224 via respective attachment members 236. Specifically, each attachment member 236 is configured to couple to support plate 224 via mounting holes 234 to enable each force device 300 to be easily removed from support frame 202 for maintenance and/or replacement.

In the exemplary embodiment, puller bracket 228 includes an open-ended slot 230 sized to receive cylindrical shaft 134 of inlet guide vane 122. Puller bracket 228 includes a plurality of flanges 232 that extend radially inward of slot 230. Flanges 232 engage cylindrical shaft 134 of inlet guide vane 122 to transmit the force from force devices 300 to inlet guide vane 122. In the exemplary embodiment, puller bracket 228 is fabricated from steel. Alternatively, puller bracket 228 may be fabricated from any other material that enables inlet guide vane removal assembly 200 to function as described herein.

In the exemplary embodiment, inlet guide vane removal assembly 200 is sized for handheld operation (i.e., inlet guide vane removal assembly 200 can be coupled to, and decoupled from, an associated inlet guide vane 122 in an elevated position manually by an operator). In some embodiments, inlet guide vane removal assembly 200 is sized for handheld operation in the sense that inlet guide vane removal assembly 200 can be operated (either by the operator holding inlet guide vane removal assembly 200 or by another operator) while inlet guide vane removal assembly 200 is being held in position using only one hand. As such, inlet guide vane removal assembly 200 is sized for easier handling when removing inlet guide vanes 122. In other embodiments, inlet guide vane removal assembly 200 may not be sized for handheld operation as set forth above (i.e., some embodiments of inlet guide vane removal assembly 200 may be sized such that inlet guide vane removal assembly 200 cannot be coupled to, and decoupled from, an associated inlet guide vane 122 in an elevated position using only one hand).

In operation, in the exemplary embodiment, inlet guide vane removal assembly 200 is coupled to a hydraulic pump (not shown) via hydraulic hoses 310 coupled between the hydraulic pump and hydraulic hose connections 308. The hydraulic pump can be any type of hydraulic pump that enables inlet guide vane removal assembly 200 to function as described herein, including for example, and without limitation, a manual pump, an electric pump, or a pneumatic pump. In the illustrated embodiment, inlet guide vane removal assembly 200 is positioned in a "rotor out" orientation, i.e., the inlet guide vane removal assembly 200 is positioned on the outer side of inlet guide vane 122, i.e., upstream or on the bell-mouth side. Alternatively, inlet guide vane removal assembly 200 is positioned in a "rotor in" orientation, i.e., downstream or the side between inlet guide vanes 122 and compressor 102, because slots 210 and 226 in guide plate 208 and support plate 224, respectively, are sized to receive inlet guide vane 122 in either orientation. In the exemplary embodiment, inlet guide vane removal assembly 200 is engaged with inlet guide vane 122 such that support frame 202 extends about inlet guide vane 122 and puller bracket 228 is engaged with cylindrical shaft 134.

In one embodiment, puller bracket 228 is engaged with cylindrical shaft 134 and support frame 202 is repositioned into place about inlet guide vane 122. In the exemplary embodiment, the hydraulic pump is actuated and actuators 302 apply a force to puller bracket 228 via engaging rods 306 against radially inner end 132 of inlet guide vane 122 (see FIG. 4) to facilitate removing inlet guide vane 122 from lowering casing 124. More specifically, in the exemplary embodiment, engaging rod 306 induces pressure substantially axially against cylindrical shaft 134 of inlet guide vane 122. After achieving a stoke length that is sufficient to remove inlet guide vane 122 from drive gear 148, engaging rod 306 is retracted into hydraulic cylinder 304. Inlet guide vane removal assembly 200 is removed from inlet guide vane 122 and inlet guide vane 122 is removed from outer ring half 160 of lower casing 124.

In an alternative embodiment, inlet guide vane removal assembly 200 includes an additional positioning plate 402 that is releasably coupled to guide plate 208 via retention hardware 404. Positioning plate 402 includes an open-ended slot 406 sized to receive inlet guide vane 122 during use of inlet guide vane removal assembly 400. Guide plate 208 includes a plurality of mounting holes 408 that enable positioning plate 402 to be positioned in a "rotor in" or a "rotor out" orientation. In the exemplary embodiment, positioning plate 402 is coupled to guide plate 208 in a "rotor out" orientation, such that positioning plate 402 is adjacent to support arms 212 and 218. In this orientation, slot 406 facilitates positioning inlet guide vane removal assembly 400 with respect to inlet guide vane 122 such that puller bracket 228 is substantially aligned with cylindrical shaft 134 of inlet guide vane 122. Alternatively, positioning plate 402 is coupled to guide plate 208 in a "rotor in" orientation, such that positioning plate 402 is adjacent to an edge of guide plate 208 and away from support arms 212 and 218. In such an orientation, inlet guide vane 122 slides further into slot 210 of guide plate 208. Slot 406 facilitates positioning inlet guide vane removal assembly 400 with respect to inlet guide vane 122 such that puller bracket 228 is substantially aligned with cylindrical shaft 134 of inlet guide vane 122.

Figure 6:
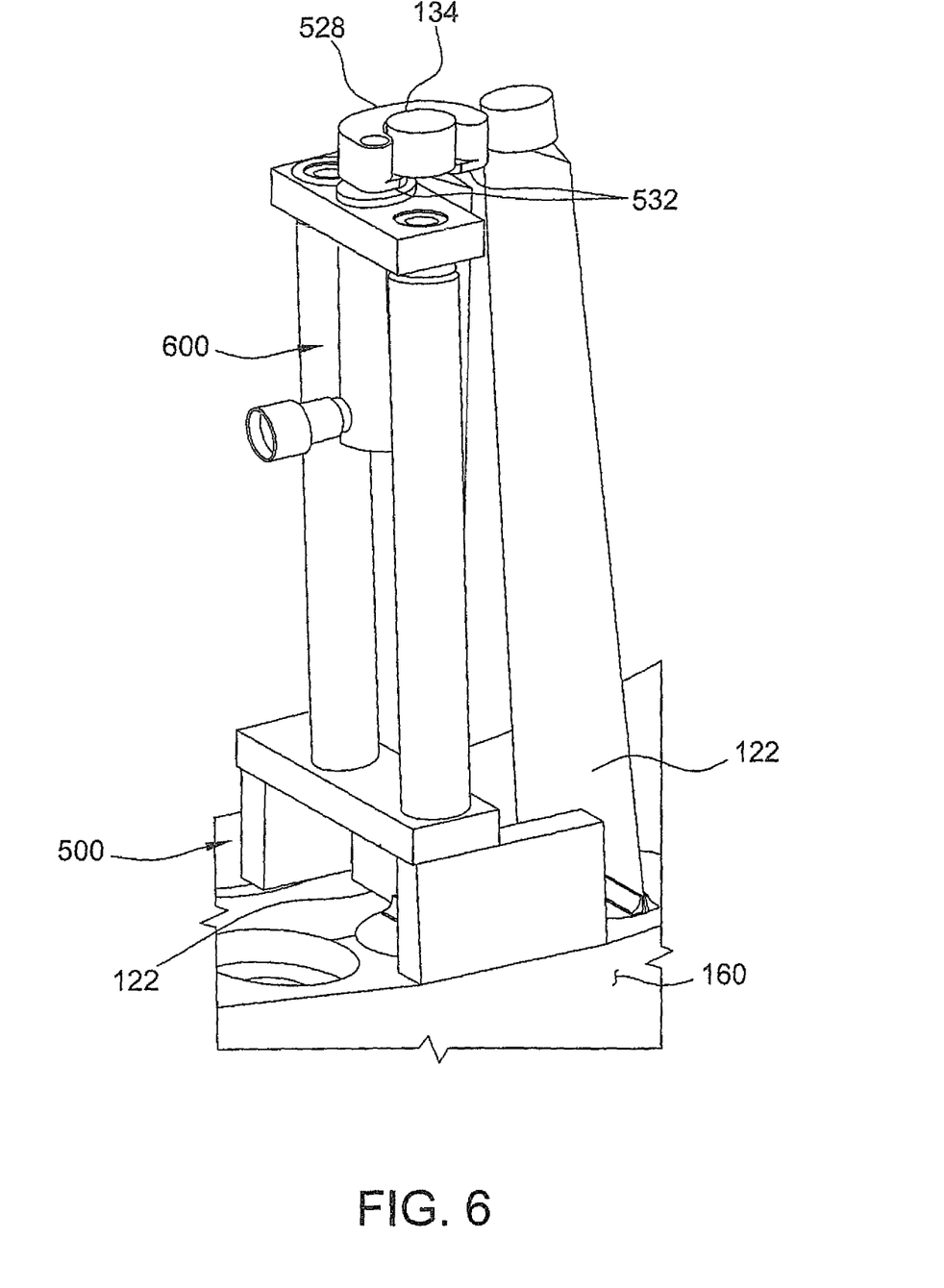
FIG. 6 is a partial perspective view of the outer ring half of FIG. 3 with another alternative exemplary inlet guide vane removal assembly installed.
Figure 7:
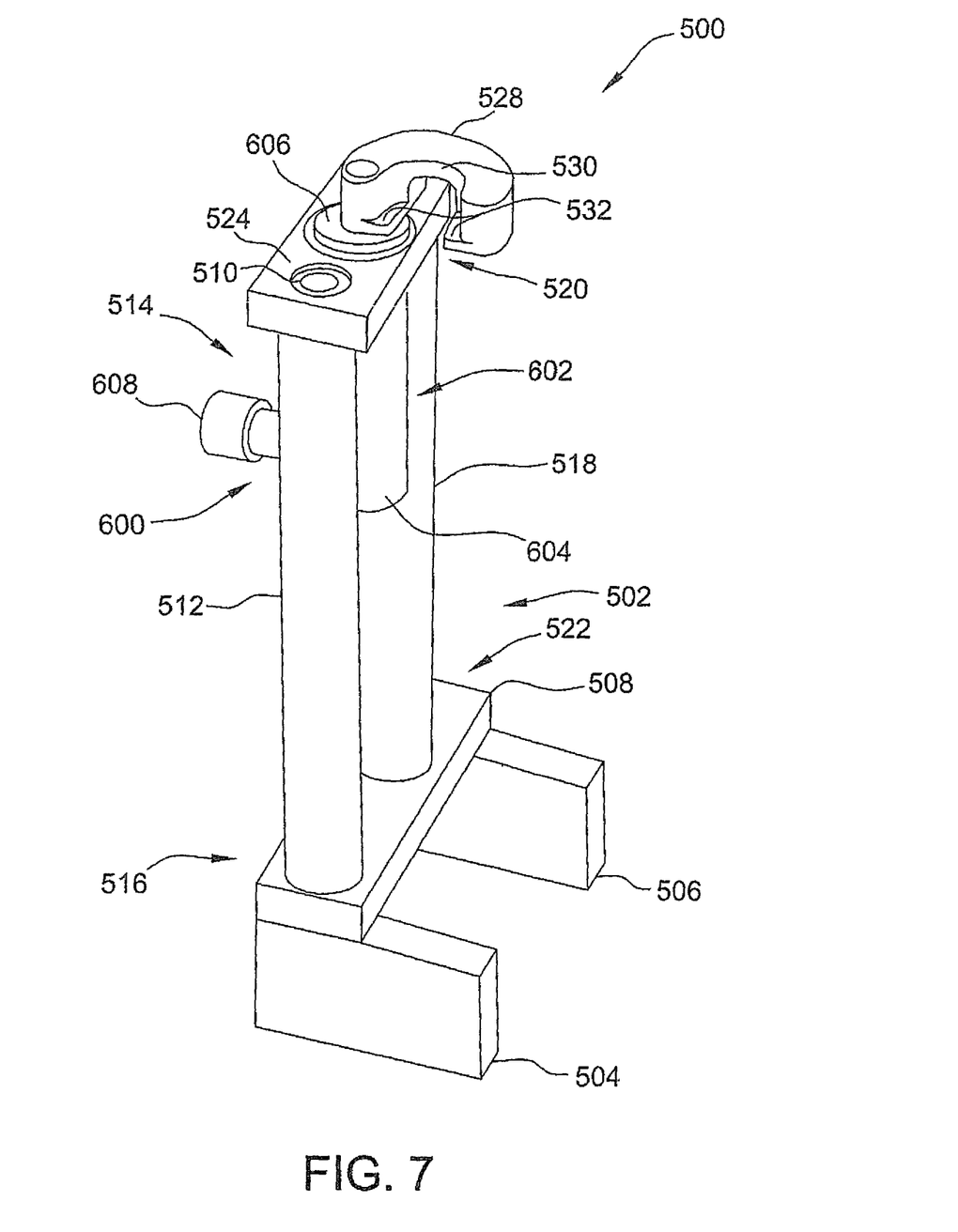
FIG. 7 is a perspective view of the inlet guide vane removal assembly of FIG. 8.

FIG. 6 is a partial perspective view of outer ring half 160 with an alternative exemplary inlet guide vane removal assembly 500 installed, and FIG. 7 is a perspective view of inlet guide vane removal assembly 500. In the exemplary embodiment, inlet guide vane removal assembly 500 includes a support frame 502 that includes a first support leg 504 and a second support leg 506 that are substantially parallel to each other. Moreover, each support leg 504 and 506 is coupled to a guide plate 508. Each support leg 504 and 506 is coupled to guide plate 508 via coupling methods that include, but are not limited to, the use of retention hardware (not shown), a welding process, and/or any other mechanical coupling means for coupling support legs 504 and 506 to guide plate 508.

Support frame 502 includes a first support arm 512 that includes an upper end 514 and a lower end 516, a second support arm 518 that includes an upper end 520 and a lower end 522, and a support plate 524 that, in the exemplary embodiment, extends between upper ends 514 and 520. In the exemplary embodiment, each support arm 512 and 518 is coupled to and forms a portion of support frame 502. More specifically, and in the exemplary embodiment, lower end 516 is coupled to first support leg 504 via guide plate 508, and lower end 522 is coupled to guide plate 508 between support legs 504 and 506. Support legs 504 and 506 are spaced a predetermined distance apart that enables inlet guide vane 122 to fit therebetween during use of inlet guide vane removal assembly 500. Each support arm 512 and 518 is coupled to guide plate 508 and support plate 524 via coupling methods that include, but are not limited to, the use of retention hardware, such as hardware 510, a welding process, and/or any other mechanical coupling means for coupling support arms 512 and 518 to guide plate 508 and support plate 524.

In the exemplary embodiment, inlet guide vane removal assembly 500 includes a force device 600 coupled to support plate 524 between support arms 512 and 518. Force device 600 includes an actuator 602 and an engaging rod 606 that is slidably coupled thereto and extending therefrom. Engaging rod 606 has a predefined stoke length that is sufficient to remove inlet guide vane 122 from drive gear 148. In the exemplary embodiment, actuator 602 is a hydraulic ram that includes a hydraulic cylinder 604 and a hydraulic piston (not shown) slidably engaged with hydraulic cylinder 604. The hydraulic piston includes engaging rod 606 that extends away from hydraulic cylinder 604 and is configured to couple to a puller bracket 528, such that as actuator 602 is operated, engaging rod 606 extends from and retracts into hydraulic cylinder 604, to impart a motive force to inlet guide vane 122 through puller bracket 528. In addition, hydraulic cylinder 604 includes a hydraulic hose connection 608 sized to receive a hose (not shown) coupled to a pump (not shown). In an alternative embodiment, force device 600 is any device that enables inlet guide vane removal assembly 500 to function as described herein, for example, and without limitation, a lead screw and drive assembly or an air cylinder. In the exemplary embodiment, force device 600 is releasably coupled to support plate 524, for example, via a treaded connection (not shown) or the use of retention hardware (not shown), to enable force device 600 to be easily removed from support frame 502 for maintenance and/or replacement.

In the exemplary embodiment, puller bracket 528 includes an open-ended slot 530 sized to receive cylindrical shaft 134 of inlet guide vane 122. Puller bracket 528 includes a plurality of flanges 532 that extend radially inward of slot 530. Flanges 532 are configured to engage cylindrical shaft 134 of inlet guide vane 122 to transmit the force from force device 600 to inlet guide vane 122. Alternatively, puller bracket 528 can have any configuration configured to receive cylindrical shaft 134 of inlet guide vane 122, for example, and without limitation, an eye clamp, that enable inlet guide vane removal assembly 500 to function as described herein.

In the exemplary embodiment, inlet guide vane removal assembly 500 is sized for handheld operation (i.e., inlet guide vane removal assembly 500 can be coupled to, and decoupled from, an associated inlet guide vane 122 in an elevated position manually by an operator). In some embodiments, inlet guide vane removal assembly 500 is sized for handheld operation in the sense that inlet guide vane removal assembly 500 can be operated (either by the operator holding inlet guide vane removal assembly 500 or by another operator) while inlet guide vane removal assembly 500 is being held in position using only one hand. As such, inlet guide vane removal assembly 500 is sized for easier handling when removing inlet guide vanes 122. In other embodiments, inlet guide vane removal assembly 500 may not be sized for handheld operation as set forth above (i.e., some embodiments of inlet guide vane removal assembly 500 may be sized such that inlet guide vane removal assembly 500 cannot be coupled to, and decoupled from, an associated inlet guide vane 122 in an elevated position using only one hand).

In operation, in the exemplary embodiment, inlet guide vane removal assembly 500 is coupled to a hydraulic pump (not shown) via a hydraulic hose (not shown) coupled between the hydraulic pump and hydraulic hose connection 608. The hydraulic pump can be any type of hydraulic pump that enables inlet guide vane removal assembly 500 to function as described herein, including for example, and without limitation, a manual pump, an electric pump, or a pneumatic pump. Inlet guide vane removal assembly 500 is positioned adjacent inlet guide vane 122. Inlet guide vane removal assembly 500 is engaged with inlet guide vane 122 such that support frame 502 extends about inlet guide vane 122 and puller bracket 528 is engaged with cylindrical shaft 134.

In one embodiment, puller bracket 528 is engaged with cylindrical shaft 134 and support frame 502 is repositioned into place about inlet guide vane 122. In the exemplary embodiment, the hydraulic pump is actuated and actuator 602 applies a force to puller bracket 528 via engaging rod 606 against radially inner end 132 of inlet guide vane 122 (see FIG. 4) to facilitate removing inlet guide vane 122 from lowering casing 124. More specifically, in the exemplary embodiment, engaging rod 606 induces pressure substantially axially against cylindrical shaft 134 of inlet guide vane 122. After achieving a stoke length that is sufficient to remove inlet guide vane 122 from drive gear 148, engaging rod 606 is retracted into hydraulic cylinder 604. Inlet guide vane removal assembly 500 is removed from inlet guide vane 122 and inlet guide vane 122 is removed from outer ring half 160 of lower casing 124.

Figures 8, 9:
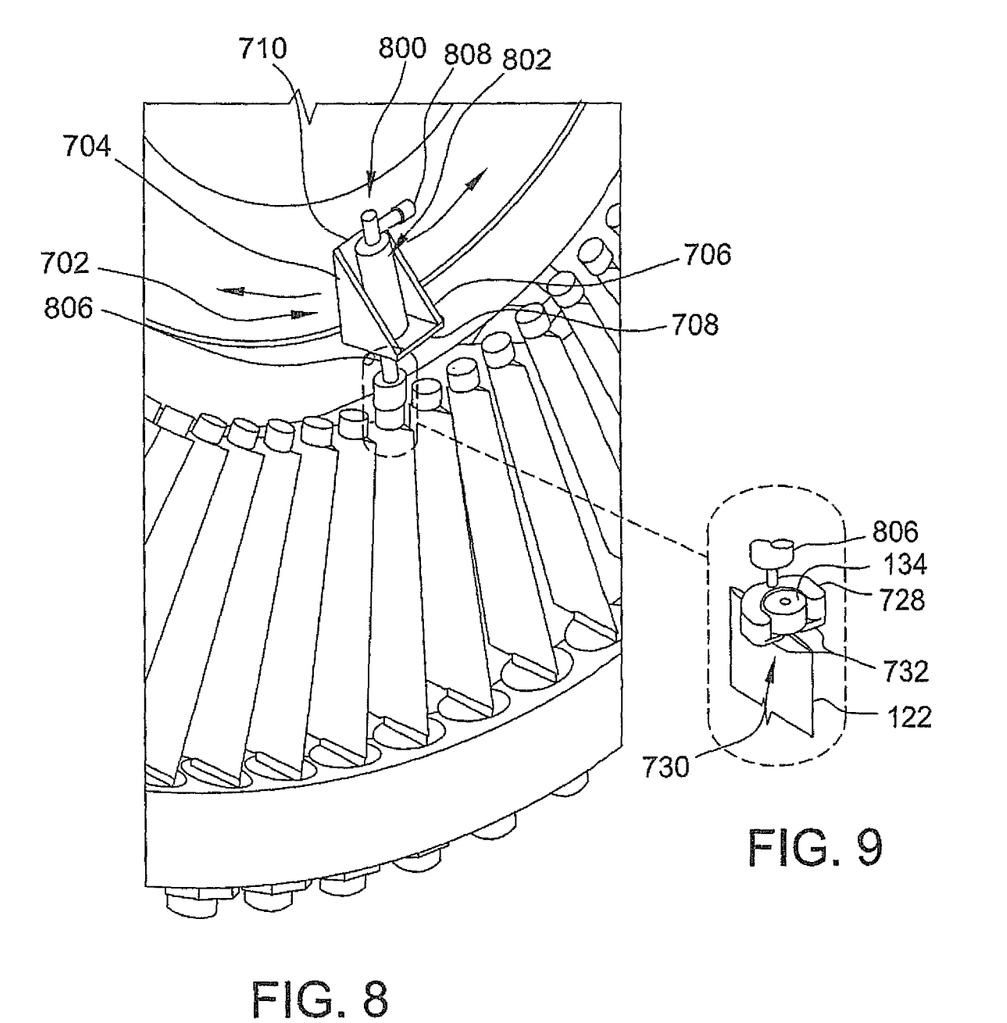
FIG. 8 is a partial perspective view of the outer ring half of FIG. 3 with another alternative exemplary inlet guide vane removal assembly installed.
FIG. 9 is an enlarged view of a puller bracket of the inlet guide vane removal assembly shown in FIG. 8.
Figure 10:
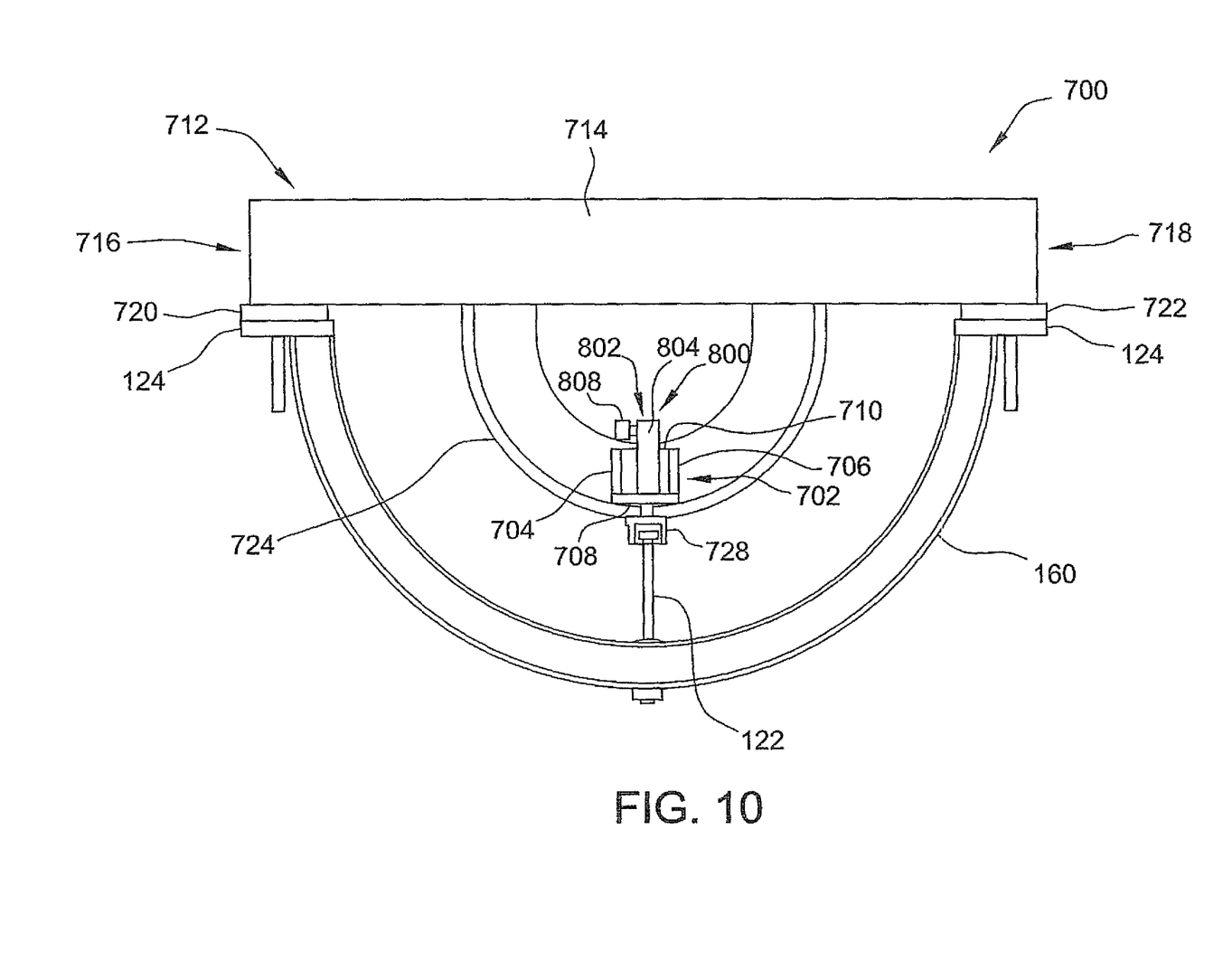
FIG. 10 is a front view of the outer ring half of FIG. 3 illustrating the inlet guide vane removal assembly of FIG. 8 and a single inlet guide vane coupled in the outer ring half.

FIG. 8 is a partial perspective view of outer ring half 160 with an alternative exemplary inlet guide vane removal assembly 700 installed. FIG. 9 is an enlarged view of a puller bracket 728 of inlet guide vane removal assembly 700 (shown in FIG. 8). FIG. 10 is a front view of outer ring half 160 illustrating inlet guide vane removal assembly 700 and a single inlet guide vane 122 coupled in outer ring half 160 of lower casing 124. In the exemplary embodiment, inlet guide vane removal assembly 700 includes a support frame 702 that includes a first gusset 704 and a second gusset 706 that are positioned substantially parallel to each other. Moreover, each gusset 704, 706 is coupled to a support plate 708 and a back plate 710. Back plate 710 and support plate 708 are positioned substantially perpendicular to each other and are coupled together via coupling methods that include, but are not limited to, the use of retention hardware (not shown), a welding process, and/or any other mechanical coupling means for coupling support plate 708 and back plate 710 together. Each gusset 704, 706 is coupled to support plate 708 and back plate 710 via coupling methods that include, but are not limited to, the use of retention hardware (not shown), a welding process, and/or any other mechanical coupling means for coupling gussets 704, 706 to support plate 708 and back plate 710.

As shown in FIG. 10, inlet guide vane removal assembly 700 includes a half ring bridge 712 that includes a support beam 714 that includes a first end 716 and an opposite second end 718. In the exemplary embodiment, half ring bridge 712 is coupled to lower casing 124 via mounting plates 720, 722. More specifically, and in the exemplary embodiment, first end 716 is coupled to lower casing 124 via mounting plate 720, and second end 718 is coupled to an opposite side of lower casing 124 via mounting plate 722, such that half ring bridge 712 extends over lower casing 124 and inlet guide vanes 122. Moreover, in the exemplary embodiment, half ring bridge 712 includes a half ring segment 724 located at a central portion of support beam 714. Half ring segment 724 is configured to be substantially concentric with lower casing 124 when half ring bridge 712 is coupled thereto. In the exemplary embodiment, support frame 702 is slidingly coupled to half ring segment 724 such that it can be positioned above and radially in line with a respective inlet guide vane 122 to provide coaxial force on inlet guide vane 122 when inlet guide vane removal assembly 700 is in use.

In the exemplary embodiment, inlet guide vane removal assembly 700 includes a force device 800 coupled to support plate 708 and positioned between gussets 704, 706. Force device 800 includes an actuator 802 and an engaging rod 806 that extends therefrom. Engaging rod 806 has a predefined stoke length that is sufficient to remove inlet guide vane 122 from drive gear 148. In the exemplary embodiment, actuator 802 is a hydraulic ram that includes a hydraulic cylinder 804 and a hydraulic piston (not shown) slidably engaged with hydraulic cylinder 804. The hydraulic piston includes engaging rod 806 that extends away from hydraulic cylinder 804 and is configured to couple to puller bracket 728, such that as actuator 802 is operated, engaging rod 806 extends from and retracts into hydraulic cylinder 804, to impart a motive force to inlet guide vane 122 through puller bracket 728. In addition, hydraulic cylinder 804 includes a hydraulic hose connection 808 sized to receive a hose (not shown) coupled to a pump (not shown). In an alternative embodiment, force device 800 is any device that enables inlet guide vane removal assembly 700 to function as described herein, for example, and without limitation, a lead screw and drive assembly or an air cylinder. In the exemplary embodiment, force device 800 is releasably coupled to support plate 708, for example, via a treaded connection (not shown) or the use of retention hardware (not shown), to enable force device 800 to be easily removed from support frame 702 for maintenance and/or replacement.

In the exemplary embodiment, puller bracket 728 includes an open-ended slot 730 sized to receive cylindrical shaft 134 of inlet guide vane 122. Puller bracket 728 includes a plurality of flanges 732 that extend radially inward of slot 730. Flanges 732 are configured to engage cylindrical shaft 134 of inlet guide vane 122 to transmit the force from force device 800 to inlet guide vane 122. Alternatively, puller bracket 728 can have any configuration configured to receive cylindrical shaft 134 of inlet guide vane 122, for example, and without limitation, an eye clamp, that enable inlet guide vane removal assembly 700 to function as described herein.

In operation, in the exemplary embodiment, inlet guide vane removal assembly 700 coupled to a hydraulic pump (not shown) via a hydraulic hose (not shown) coupled between the hydraulic pump and hydraulic hose connection 808. The hydraulic pump can be any type of hydraulic pump that enables inlet guide vane removal assembly 700 to function as described herein, including for example, and without limitation, a manual pump, an electric pump, or a pneumatic pump. Inlet guide vane removal assembly 700 is positioned axially in line with inlet guide vane 122 along half ring bridge 712. Inlet guide vane removal assembly 700 is engaged with inlet guide vane 122 such that puller bracket 728 is engaged with cylindrical shaft 134.

In one embodiment, puller bracket 728 is engaged with cylindrical shaft 134 by rotating puller bracket 728 into place about cylindrical shaft 134. In the exemplary embodiment, the hydraulic pump is actuated and actuator 802 applies a force to puller bracket 728 via engaging rod 806 against radially inner end 132 of inlet guide vane 122 (see FIG. 8) to facilitate removing inlet guide vane 122 from lowering casing 124. More specifically, in the exemplary embodiment, engaging rod 806 induces pressure substantially axially against cylindrical shaft 134 of inlet guide vane 122. After achieving a stoke length that is sufficient to remove inlet guide vane 122 from drive gear 148, engaging rod 806 is extended from hydraulic cylinder 804. Inlet guide vane removal assembly 700 is removed from inlet guide vane 122 and inlet guide vane 122 is removed from outer ring half 160 of lower casing 124.

The methods and systems described herein facilitate the removal of inlet guide vanes in a less laborious and less time-consuming manner. The methods and systems also facilitate removing drive gears from inlet guide vanes that are accessible only in locations and openings that are more difficult to reach, such as in the lower half of a turbine assembly. For example, the methods and systems facilitate reducing the amount of time needed to pull drive gears that retain the inlet guide vanes in the turbine assembly. As such, the methods and systems facilitate reducing the amount of time needed to conduct an inspection, or to perform routine service, on the inlet guide vanes of the turbine assembly. Moreover, the methods and systems facilitate reducing the amount of time that a turbine assembly is offline during inspection and/or during servicing, which in turn facilitates reducing the overall costs associated with inspecting and/or servicing the turbine assembly.

Exemplary embodiments of methods and systems for removing inlet guide vanes are described above in detail. The methods and systems described herein are not limited to the specific embodiments described herein, but rather, components of the systems and steps of the methods may be utilized independently and separately from other components and steps described herein. For example, the methods and systems described herein may have other applications not limited to practice with turbine assemblies, as described herein. Rather, the methods and systems described herein can be implemented and utilized in connection with various other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems and methods described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. An inlet guide vane removal assembly comprising:
a support frame comprising a support plate;
a pair of force devices coupled to said support plate, each force device of said pair of force devices comprising an actuator and an engaging rod slidably coupled thereto; and
 a puller bracket coupled to each said engaging rod of said each force device, said puller bracket comprising:
  an open-ended slot defined therethrough; and
  a plurality of flanges positioned to engage an installed inlet guide vane such that, when at least one force device of said pair of force devices is actuated, said puller bracket is displaced relative to said support frame to facilitate removal of the inlet guide vane.

2. An inlet guide vane removal assembly in accordance with claim 1, wherein said support plate comprises an open-ended slot defined therein and configured to receive an airfoil portion of the inlet guide vane.

3. An inlet guide vane removal assembly in accordance with claim 1, wherein said support frame further comprises a guide plate spaced from said support plate.

4. An inlet guide vane removal assembly in accordance with claim 3, wherein said support plate comprises an open-ended slot defined therein and configured to receive an airfoil portion of the inlet guide vane.

5. An inlet guide vane removal assembly in accordance with claim 3, wherein said guide plate comprises an open-ended slot defined therein and configured to receive an airfoil portion of the inlet guide vane.

6. An inlet guide vane removal assembly in accordance with claim 3, wherein said support frame comprises a positioning plate releasably coupled to said guide plate, said positioning plate configured to couple to said guide plate in a first positioned configured to facilitate installing said inlet guide vane removal assembly in a rotor in orientation, and a second positioned configured to facilitate installing said inlet guide vane removal assembly in a rotor out orientation.

7. An inlet guide vane removal assembly in accordance with claim 6, wherein said positioning plate comprises an open-ended slot defined therein and configured to receive an airfoil portion of the inlet guide vane.

8. An inlet guide vane removal assembly in accordance with claim 1, wherein said at least one force device is one or more of the following: a hydraulic ram, a lead screw and drive assembly, and an air cylinder.

9. An inlet guide vane removal assembly in accordance with claim 1 further comprising a half ring bridge configured to couple to a casing of a turbine assembly, said half ring bridge comprising a support beam and a half ring segment configured to receive said support frame.

10. A method for removing an inlet guide vane from a turbine assembly, said method comprising:
at least partially disassembling a casing of the turbine assembly to provide access to the inlet guide vane;
engaging the inlet guide vane using an inlet guide vane removal assembly;
applying a force to a puller bracket of the inlet guide vane removal assembly using at least one force device of a pair of force devices, such that the inlet guide vane is displaced within the turbine assembly, to facilitate removing a drive gear from the inlet guide vane, wherein each force device of said pair of force devices comprises an actuator and an engaging rod slidably coupled thereto, and wherein the puller bracket is coupled to each said engaging rod of said each force device; and
removing the inlet guide vane from the turbine assembly.

11. A method in accordance with claim 10, wherein engaging the inlet guide vane comprises engaging a cylindrical shaft of the inlet guide vane with the puller bracket.

12. A method in accordance with claim 11, wherein applying the force to the puller bracket comprises applying the force substantially axially to the cylindrical shaft of the inlet guide vane.

13. A method in accordance with claim 10, wherein applying the force to the puller bracket comprises applying the force to the puller bracket via each engaging rod of the pair of force devices.

14. A method in accordance with claim 10 further comprising:
coupling a half ring bridge to the at least partially disassembled casing; and coupling the inlet guide vane removal assembly to the half ring bridge.

15. A method in accordance with claim 10, wherein engaging the inlet guide vane using the inlet guide vane removal assembly further comprises positioning an airfoil of the inlet guide vane in an open-ended slot formed in a guide plate of the inlet guide vane removal assembly.

16. A method in accordance with claim 15, wherein positioning the airfoil of the inlet guide vane in the open-ended slot comprises:
   coupling a positioning plate to the guide plate in a rotor in orientation; and
   engaging the inlet guide vane with the inlet guide vane removal assembly in the rotor in orientation.

17. A method in accordance with claim 15, wherein positioning the airfoil of the inlet guide vane in the open-ended slot comprises:
   coupling a positioning plate to the guide plate in a rotor out orientation; and
   engaging the inlet guide vane with the inlet guide vane removal assembly in the rotor out orientation.

18. An inlet guide vane removal assembly comprising:
   a support frame comprising a support plate;
   at least one force device coupled to said support plate;
   a half ring bridge configured to couple to a casing of a turbine assembly, said half ring bridge comprising a support beam and a half ring segment configured to receive said support frame; and
   a puller bracket coupled to said at least one force device, said puller bracket comprising:
      an open-ended slot defined therethrough; and
      a plurality of flanges positioned to engage an installed inlet guide vane such that, when said at least one force device is actuated, said puller bracket is displaced relative to said support frame to facilitate removal of the inlet guide vane.

* * * * *

UNITED STATES PATENT AND TRADEMARK OFFICE
CERTIFICATE OF CORRECTION

| | | |
|---|---|---|
| PATENT NO. | : 11,022,147 B2 | |
| APPLICATION NO. | : 16/349104 | |
| DATED | : June 1, 2021 | |
| INVENTOR(S) | : Piotr Hubert Wojciechowski et al. | |

It is certified that error appears in the above-identified patent and that said Letters Patent is hereby corrected as shown below:

On the Title Page

Item (73) Assignee should read:
General Electric Company,
Schenectady, NY (US)

Signed and Sealed this
Sixteenth Day of April, 2024

Katherine Kelly Vidal
*Director of the United States Patent and Trademark Office*